March 5, 1957
W. R. HOLMES
2,784,353
GENERATOR PROTECTING DEVICE
Filed Dec. 29, 1949
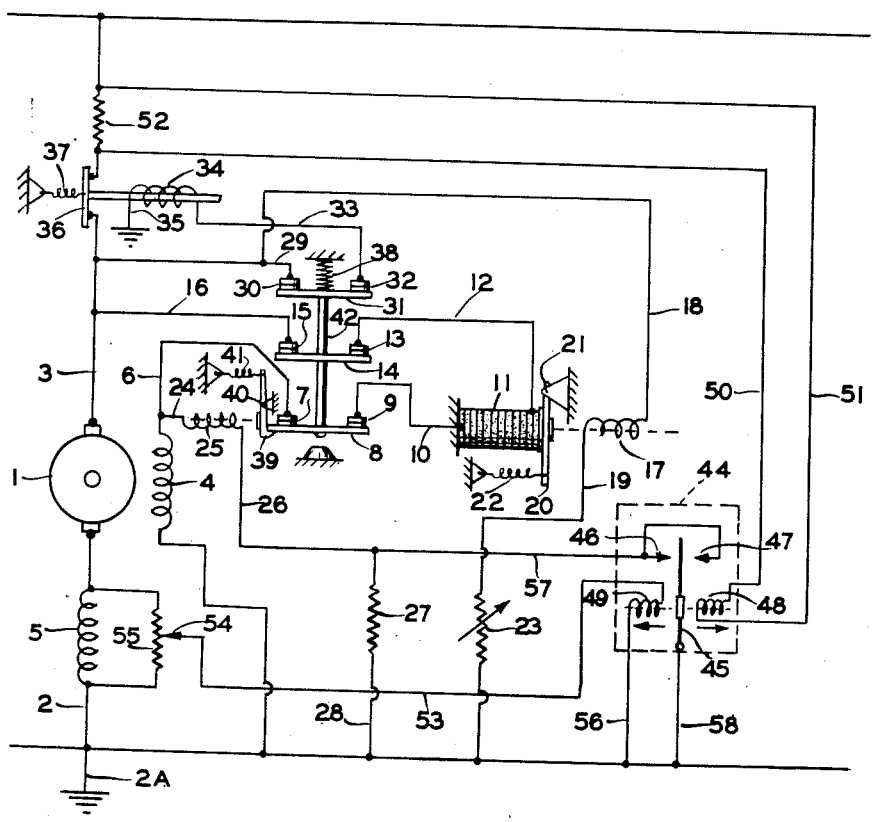
INVENTOR.
WILLIAM R. HOLMES
BY
*Herbert La Davis, Jr.*
ATTORNEY United States Patent Office 2,784,353
Patented Mar. 5, 1957

2,784,353
GENERATOR PROTECTING DEVICE

William R. Holmes, New York, N. Y., assignor to Bendix Aviation Corporation, Teterboro, N. J., a corporation of Delaware Application December 29, 1949, Serial No. 135,681

5 Claims. (Cl. 317—13)

The present invention relates to protective systems, and more particularly to protective systems for faults on generator load leads.

In airplanes, it is highly expedient to protect the electrical system against trouble of all kinds, not only to protect the electrical equipment but also to prevent any potential fire hazard from developing. Generators, of the type used in airplanes, normally have overvoltage and overload relays. Due to the load on the generator, it is necessary that the overload relay trip value be set high enough to carry the normal loads. Often faults on the generator load line may develop that would not be sufficient to trip the overload relay yet would be a hazard to the system.

One of the objects of the present invention is to provide a sensitive differential type relay to detect such faults yet not be affected by changes in the system load.

Another object of the invention is to provide improved means for detecting faults on the generator load leads.

Another object of the invention is to provide improved means for disconnecting the generator from the line when a fault occurs.

Another object of the invention is to provide an improved protective system for generators.

These and other objects and features of the invention will appear more fully hereinafter from a consideration of the following description taken in connection with the accompanying drawing wherein one embodiment of the invention is illustrated by way of example.

In the drawing:

The single figure is a schematic diagram of a generator and associated circuits embodying one form of the invention.

Referring to the drawing, there is provided a generator 1 having output lines 2 and 3, field winding 4 and interpole and compensating winding 5. The winding 5 is connected in series with one output terminal of the generator 1 and the output line 2. The field winding 4 is connected at one end to the output line 2 while the opposite end of the field winding 4 is connected by a conductor 6 to one contact 7 which is controlled by a switch member 8 which cooperates with a second switch contact 9. Leading from the switch contact 9 is a conductor 10 which in turn is connected to one end of a variable resistance carbon pile element 11. The other end of the carbon pile element 11 is connected by a conductor 12 to a switch contact 13 controlled by a switch member 14 which cooperates with a second switch contact 15. Leading from the switch contact 15 is a conductor 16 which is connected to the output line 3.

A winding 17 is connected by conductors 18 and 19 across the output lines 2 and 3 and provides electromagnetic means which are so arranged in the carbon pile regulator as to control an armature 20 thereof and thereby the pressure applied to the carbon pile 11. The regulator is shown diagrammatically in the drawing as including the armature 20 pivoted at 21 and exerting a compressive force upon the carbon pile 11 under tension of a spring 22. The spring 22 is arranged so as to balance the pull on the armature 20 by the electromagnet 17 when energized by a line voltage having a predetermined value. A variable resistance 23 inserted in the conductor 19 permits adjustment of the electromagnet 17. The regulator is preferably of a type such as shown in U. S. Patent No. 2,427,805, granted September 23, 1947, to William G. Neild.

Leading from the conductor 6 is a conductor 24 connected to one end of a potential coil 25. The other end of coil 25 is connected by a conductor 26 to one end of a resistor 27. The other end of resistor 27 is connected by a conductor 28 to the output line 2. With the switches 8 and 14 in the closed position as shown, it will be seen that the carbon pile 11 will be connected in series with the field 4 of the generator 1 so as to regulate the voltage across the lines 2 and 3. The line 2 is grounded at 2A.

Leading from the output line 3 is a conductor 29 connected to a switch contact 30 controlled by a switch member 31 which cooperates with a second switch contact 32. The switch contact 32 is connected by a conductor 33 to an electromagnetic winding 34. The winding 34 is grounded at the opposite end by a conductor 35. The winding 34 controls a main line circuit breaker 36 which is biased in a circuit open position by a spring 37.

The switch members 8, 14 and 31 are biased under tension of a spring 38 in a direction for opening the respective circuits controlled thereby but the same are held from opening by a latch member 39 pivoted at 40 under tension of a spring 41 so as to lock the several switch members 8, 14 and 31 in a circuit closing position.

The several switches 8, 14 and 31 are mechanically held by a suitable rod 42. Thus the switches 8, 14 and 31 are normally held in a circuit closing position by the latch 39. The latch 39 is controlled by the winding 25 which is connected as previously described across the field winding 4 of the generator 1.

The control system as set forth above is described and claimed in applications Serial No. 701,266, filed October 4, 1946, by William F. Fell which matured into U. S. Patent 2,508,665 and is now Reissue 23,351 and Serial No. 701,332, filed October 4, 1946, by Robert L. Brown, now U. S. Patent 2,522,601.

A sensitive differential type relay 44 is provided and comprises a movable armature 45, contacts 46 and 47 and coils 48 and 49. The coil 48 is connected by conductors 50 and 51 across a resistance 52 located in the line 3 while one end of the coil 49 is connected by conductor 53 to a movable tap 54 on the potentiometer 55. The potentiometer 55 is connected across the interpole and compensating winding 5. The other end of the coil 49 is connected by conductor 56 to output line 2. The contacts 46 and 47 are connected by a conductor 57 to the conductor 26 and the armature 45 is connected by a conductor 58 to the output line 2.

In operation, the potentiometer 55 is adjusted so that under normal load conditions, the voltage drop across the potentiometer 55 and resistor 52 are equal hence the flow of current in the coils 48 and 49 will be equal and inasmuch as they are opposing will cancel the effect of each other on the armature 45 permitting it to remain in a neutral position.

Upon the occurence of a fault between the positive feeder and ground (or between the positive and negative feeders in an ungrounded system) the voltage drop across the resistor 52 and potentiometer 55 will be of unequal value due to the difference in current in the interpole and compensating winding 5 and the resistor 52. This difference in voltage drop will cause one of the coils 48 or 49 to exert a greater pull on the armature 45 thus moving it from the neutral position into operative relation with one of the contacts depending upon the direction of the unbalance.

Upon the relay 44 being actuated the resistance 27 is shorted out. This increases the voltage applied to the coil 25 to a value above the predetermined minimum and is sufficient to affect the latch mechanism 39 to cause actuation of switch members 8, 14 and 31 to open the generator field circuit and also to deenergize the circuit for controlling the main line switch 36 thereby isolating the fault.

Although only one embodiment of the invention has been illustrated and described, various changes in the form and relative arrangement of the parts, which will now appear to those skilled in the art, may be made without departing from the scope of the invention.

What is claimed is:

1. A protective system for disconnecting an electrical machine from a load circuit upon a fault occurring therein, comprising a dynamoelectric machine having a field winding, a circuit for energizing said field winding, an overvoltage relay connected across said field winding, switch means actuated by said overvoltage relay for controlling the energization of said field winding and for controlling the connection of said dynamoelectric machine to the load circuit, a differential relay including a first operating coil responsive to the current flow in an output line of said dynamoelectric machine, a second operating coil responsive to the current flow in another output line of said dynamoelectric machine, and means operated by said differential relay in response to the difference in current flow in said operating coils to cause said overvoltage relay to deenergize said field winding and to disconnect said dynamoelectric machine from said load circuit.

2. A protective system for disconnecting a generator having a field circuit and positive and negative output lines from a load circuit upon a fault occurring therein, comprising an overvoltage relay device connected across said output lines, contact means in said field circuit and in one of said output lines, said contact means being affected by said overvoltage relay device, a balanced differential relay having an operating coil responsive to the current flow in said positive output line, and an operating coil responsive to the current flow in said negative output line, said differential relay being operable to an unbalanced position upon the current flow in said operating coils being unequal, and means responsive when said differential relay is in either of its unbalanced positions for affecting said overvoltage relay device to cause said contact means in said one output line to disconnect the generator from the load circuit and deenergize said field circuit.

3. A protective system for a dynamoelectric machine having positive and negative output lines, and a field winding adapted to be energized from said output lines, comprising an overvoltage protection relay responsive to the voltage in said field winding for controlling the connection of said dynamoelectric machine and said field winding, a polarized relay having opposing operating coils, one of said coils being connected in shunt with a portion of one of said output lines, the other of said coils being connected in shunt with a portion of the other of said output lines, means for balancing said coils for a predetermined output condition, and means including said polarized relay responsive to an unbalance between said coils to actuate said overvoltage relay to disconnect said field winding and said dynamoelectric machine from said output lines.

4. A system for protecting a dynamoelectric machine upon a fault occurring in the output circuit thereof, comprising an overvoltage coil responsive to the voltage in said output circuit, a resistance in series with said overvoltage coil, relay means responsive to said overvoltage coil for disconnecting said machine from said output circuit upon the voltage of said coil exceeding a predetermined value, and a differential relay responsive to unbalance of current between predetermined points in said output circuit to shunt said series resistor thereby to cause said voltage in said coil to exceed said predetermined value.

5. A system for protecting a dynamoelectric machine having positive and negative output lines upon a fault occurring on one of said lines, comprising an overvoltage winding, a resistance, means for connecting said winding and said resistance across said output lines, relay means responsive to said winding for disconnecting said machine from said lines upon the voltage of said winding exceeding a predetermined value, a polarized relay having opposing operating coils, one of said coils being connected in shunt with said positive output line, the other of said coils being connected in shunt with said negative output line, means for balancing said coils for a predetermined output condition, and means including said polarized relay responsive to an unbalance between said coils to shunt said resistance to cause the voltage in said overvoltage winding to exceed said predetermined value.

References Cited in the file of this patent

UNITED STATES PATENTS

| | | |
|---|---|---|
| 1,023,264 | McElroy | Apr. 16, 1912 |
| 1,216,236 | Laycock | Feb. 13, 1917 |
| 1,685,949 | Fortescue | Oct. 2, 1928 |
| 1,731,955 | Von Schaubert | Oct. 15, 1929 |
| 1,731,971 | Courtin et al. | Oct. 15, 1929 |
| 1,901,628 | Brainard | Mar. 14, 1933 |
| 1,906,817 | Seeley | May 2, 1933 |
| 2,534,895 | Austin et al. | Dec. 19, 1950 |